April 30, 1929.  B. V. SOUTO  1,711,067
CONVERTIBLE PARLOR CHAIR CAR AND SLEEPER
Filed Aug. 12, 1927   10 Sheets-Sheet 1
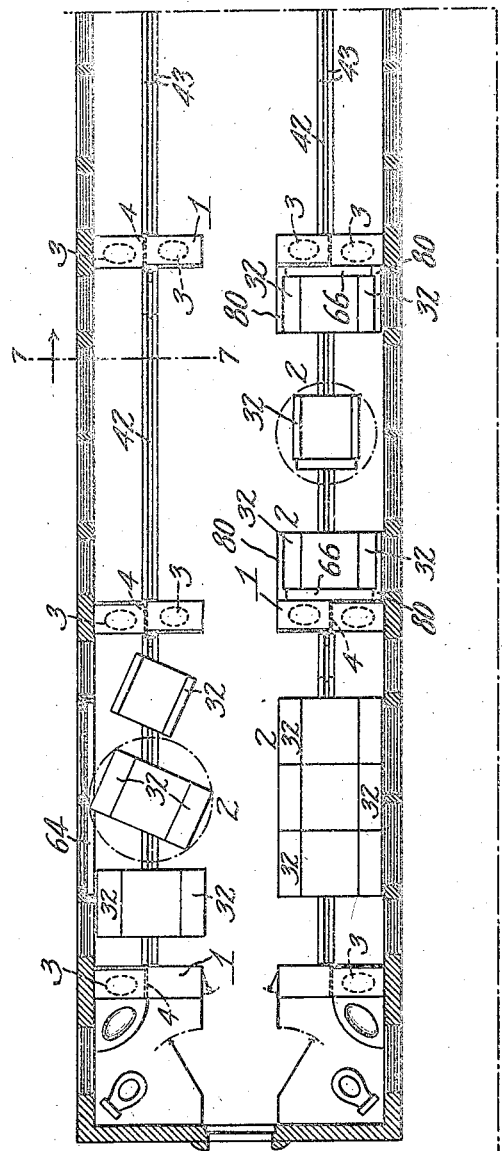
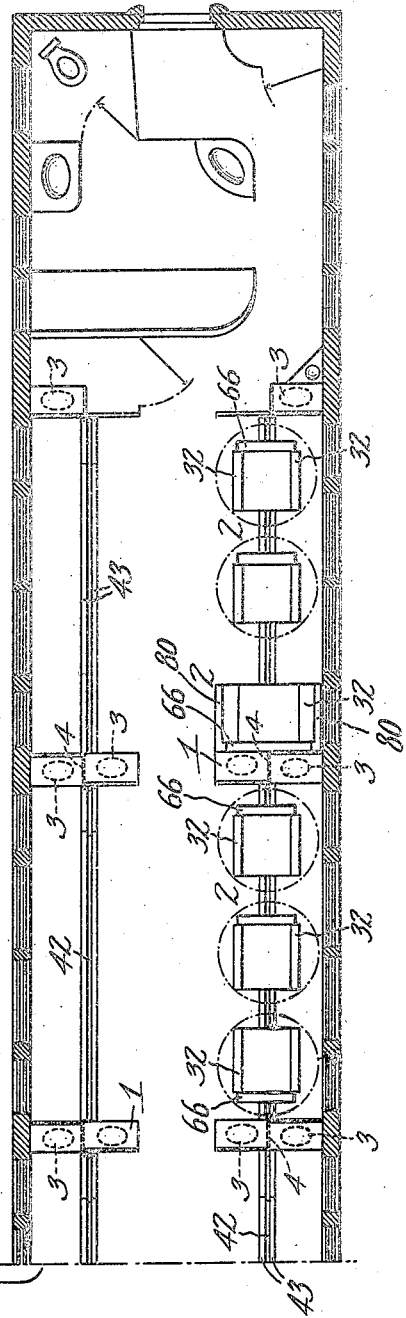
Fig. 1.
WITNESS
Oliver W. Holmes
INVENTOR
B. V. SOUTO
BY
ATTORNEYS April 30, 1929. B. V. SOUTO 1,711,067
CONVERTIBLE PARLOR CHAIR CAR AND SLEEPER
Filed Aug. 12, 1927 10 Sheets-Sheet 3

WITNESS
Oliver W. Holmes

INVENTOR
B. V. SOUTO
BY Knight Bro.
ATTORNEYS

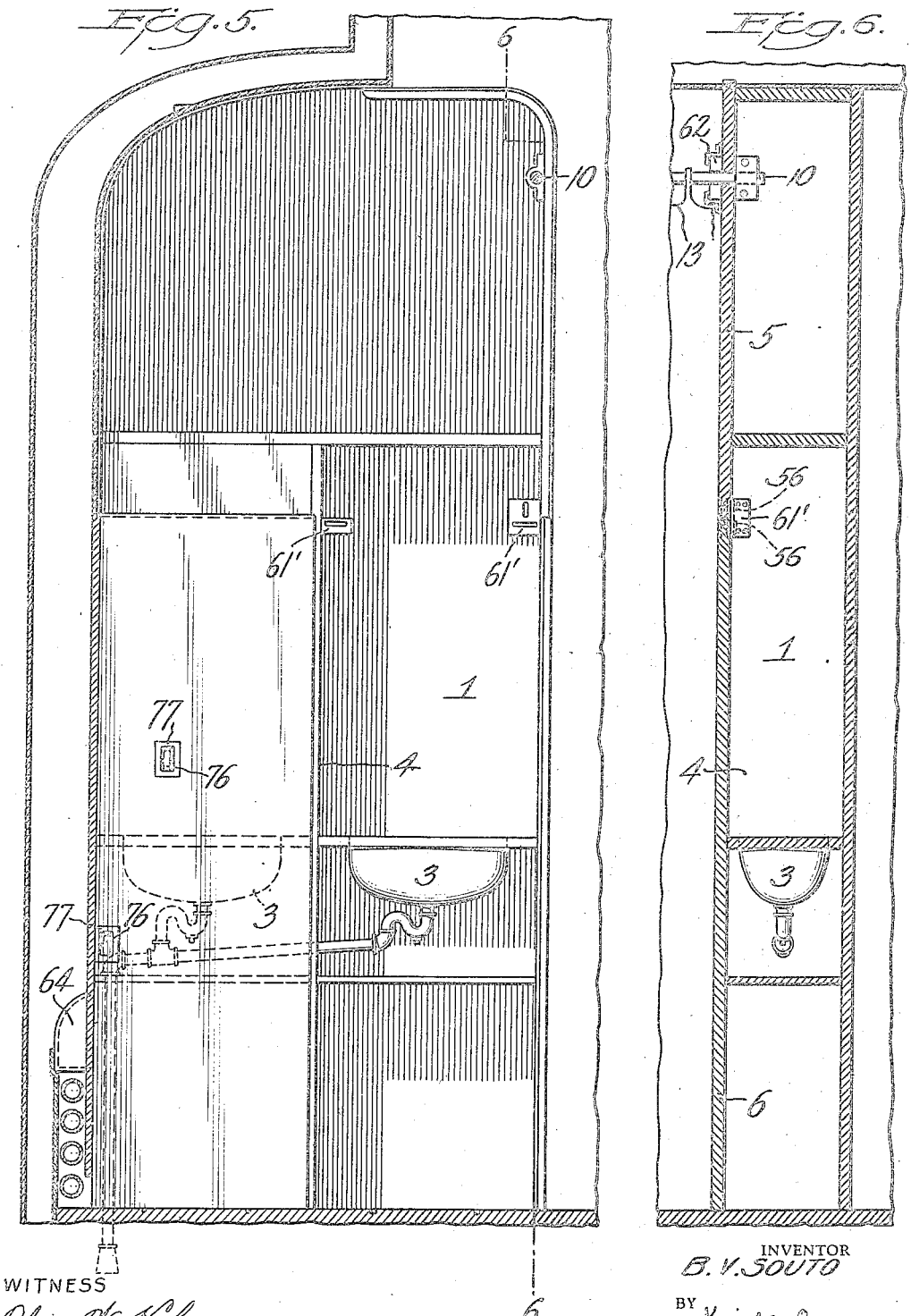

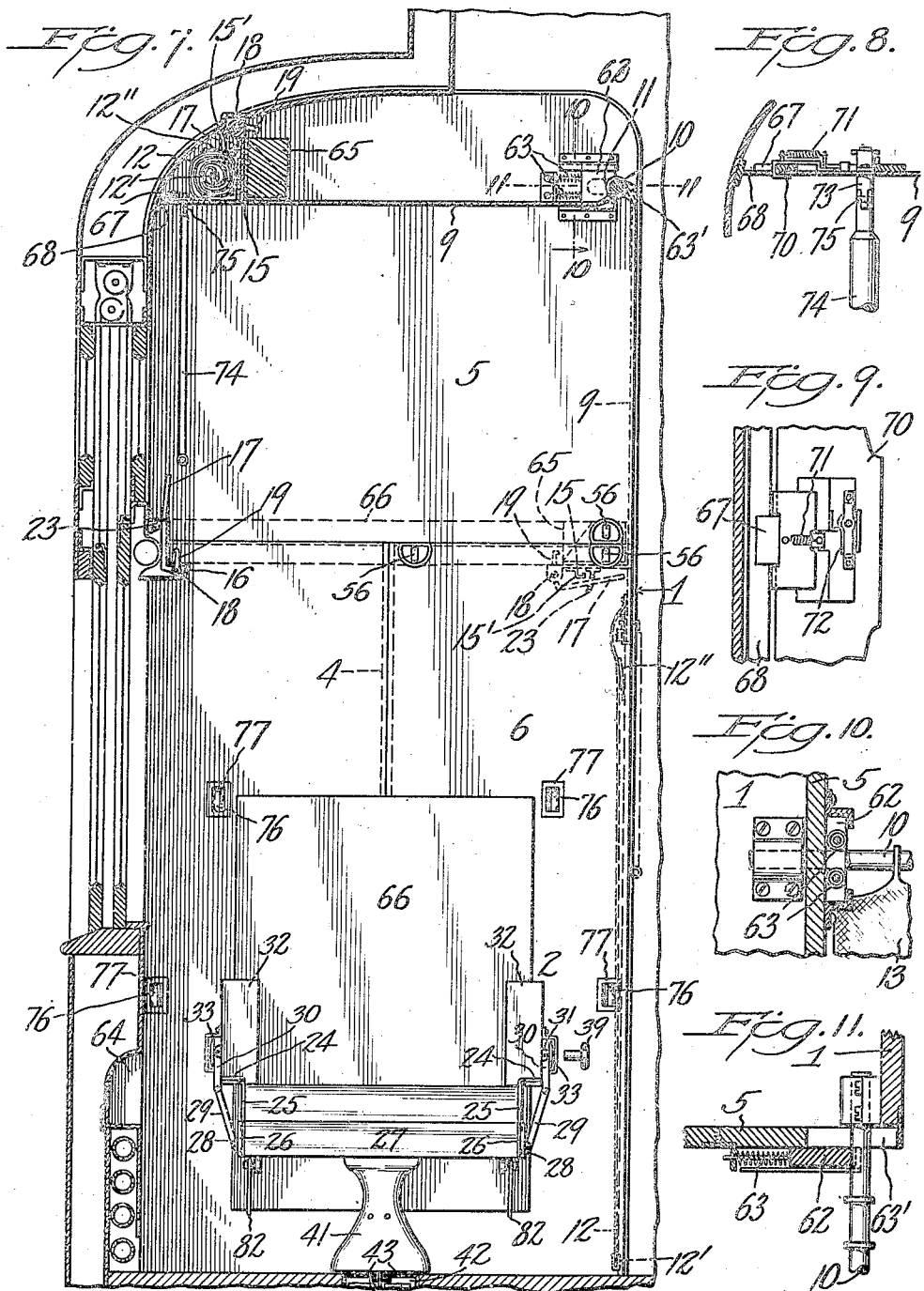

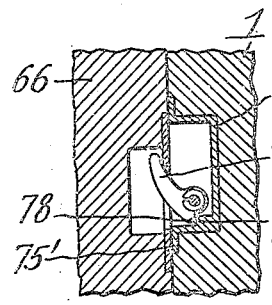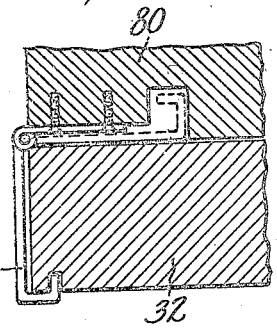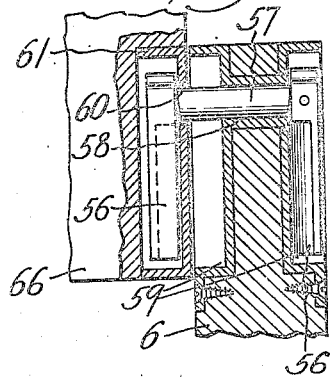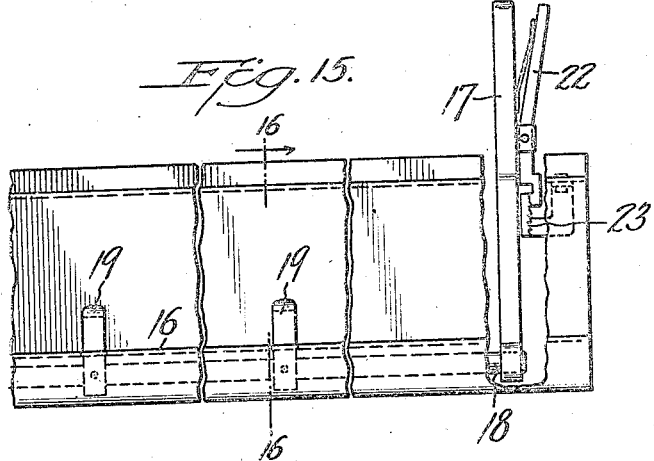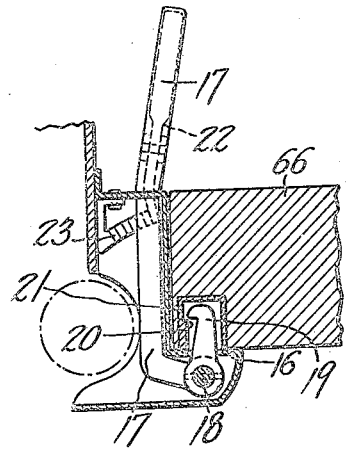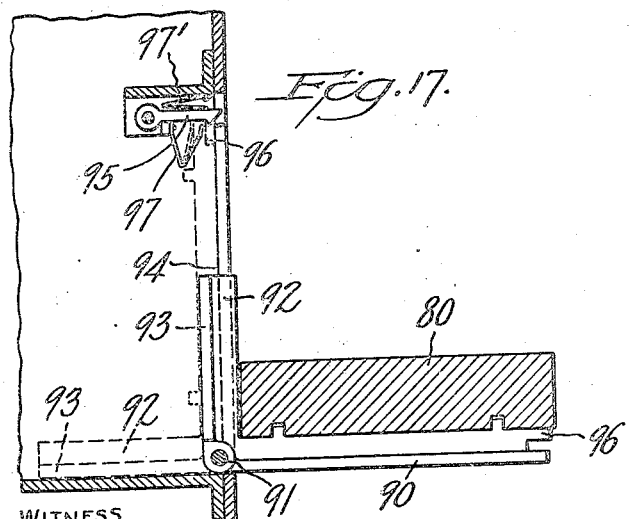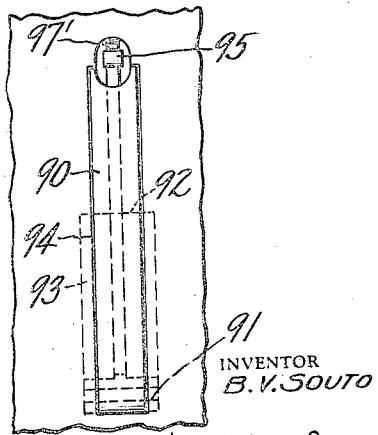

April 30, 1929.  B. V. SOUTO  1,711,067
CONVERTIBLE PARLOR CHAIR CAR AND SLEEPER
Filed Aug. 12, 1927  10 Sheets-Sheet 7
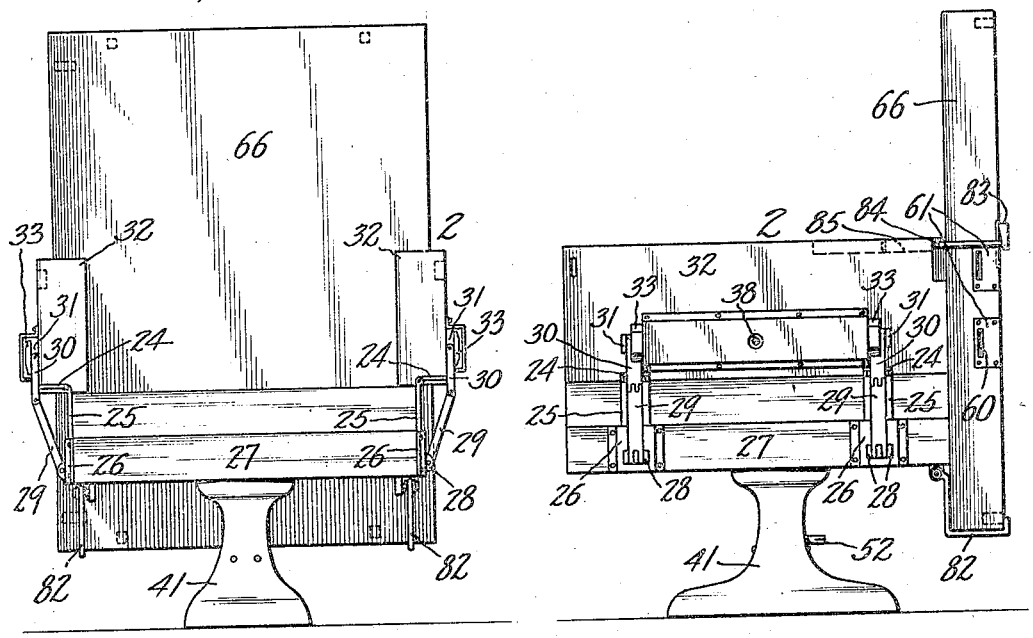
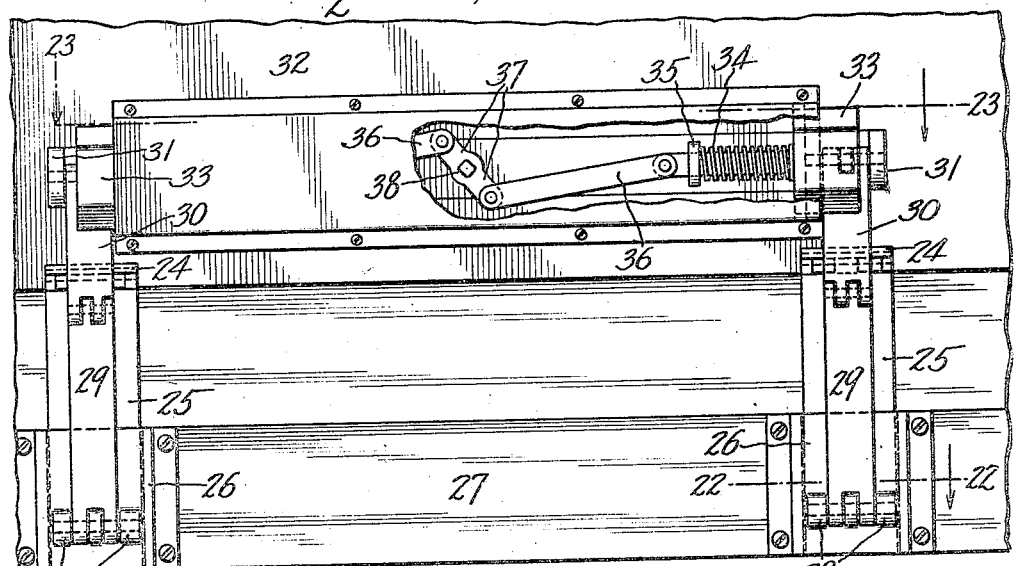
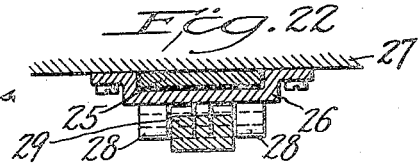
WITNESS
INVENTOR
B. V. SOUTO
BY
ATTORNEYS

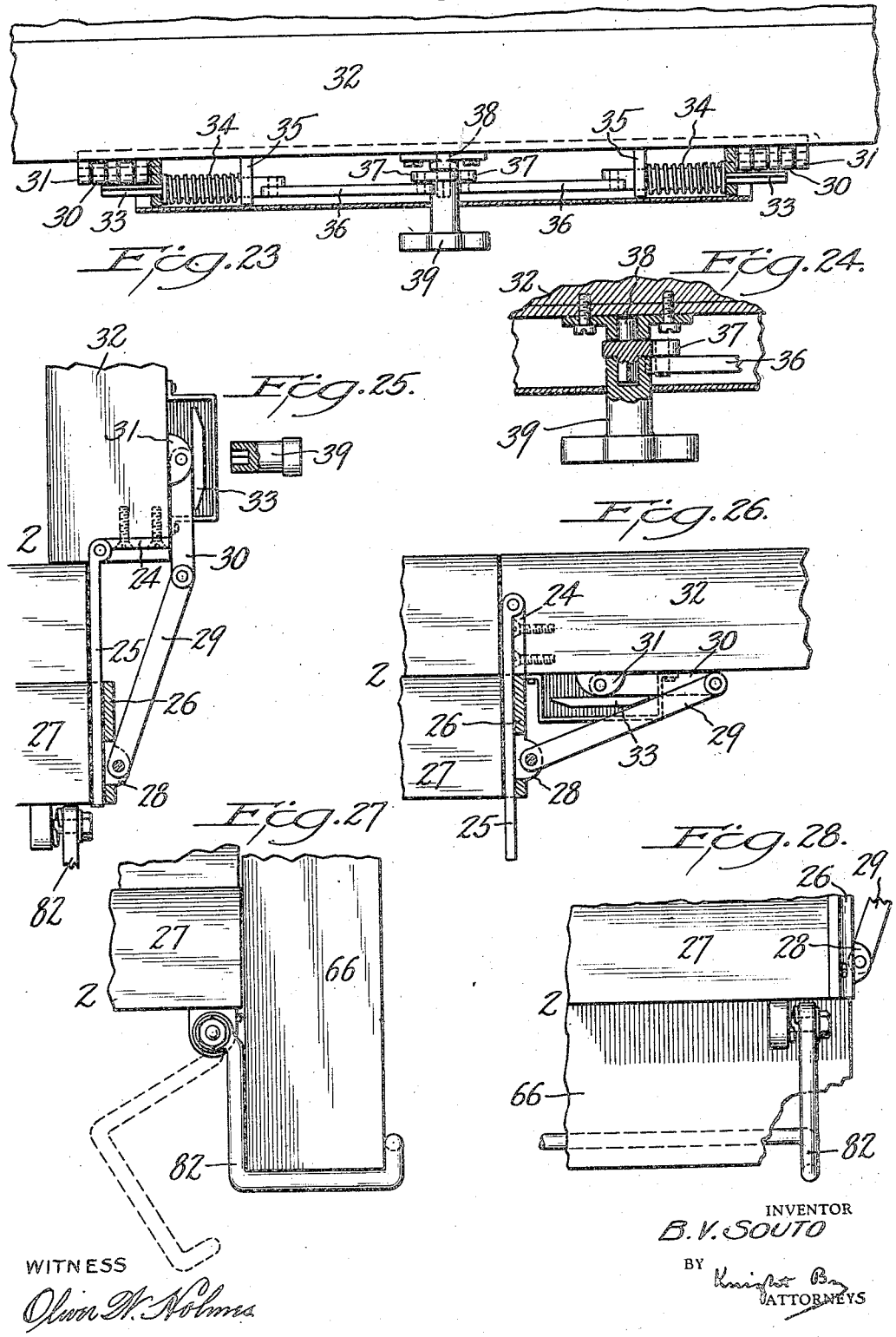

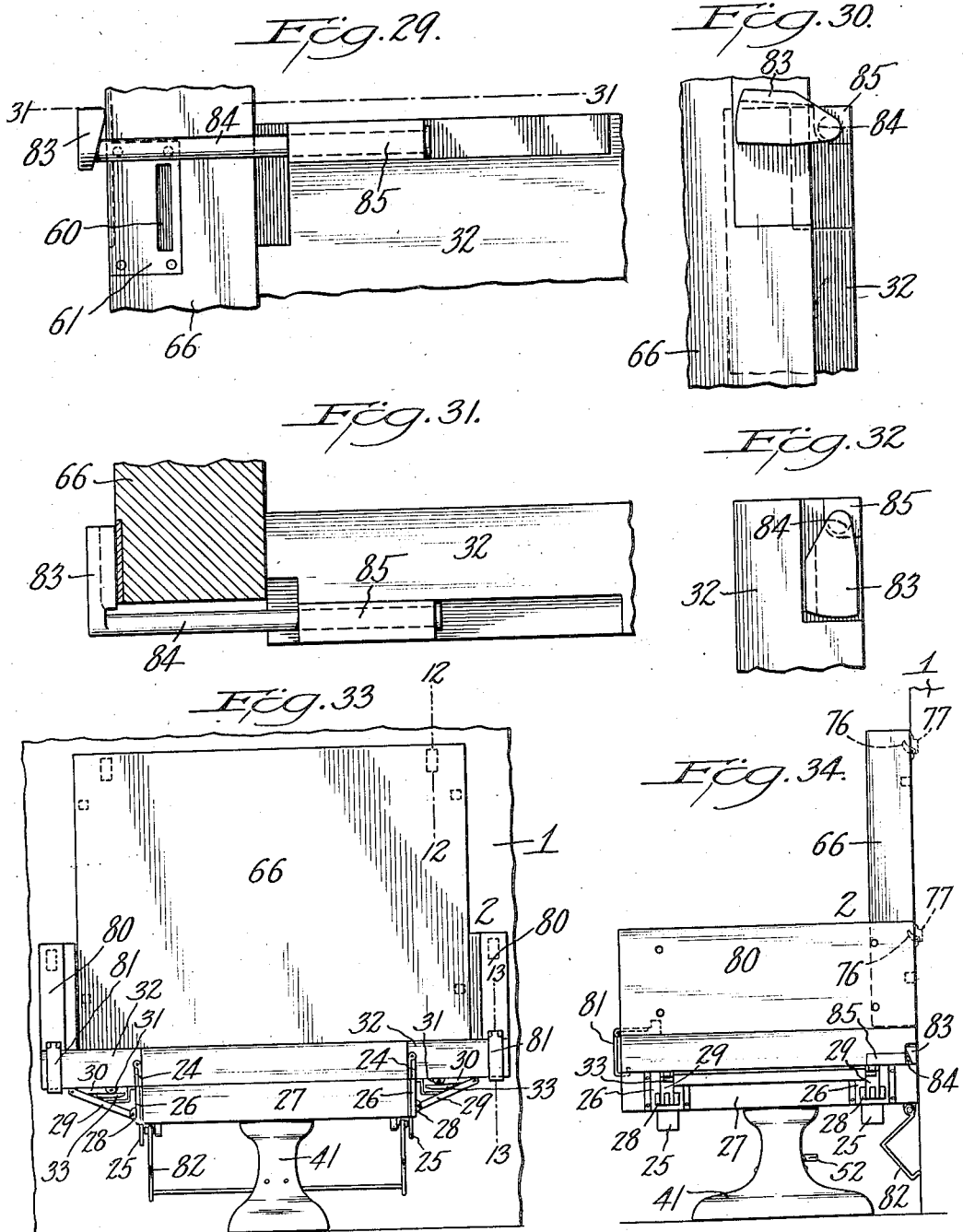

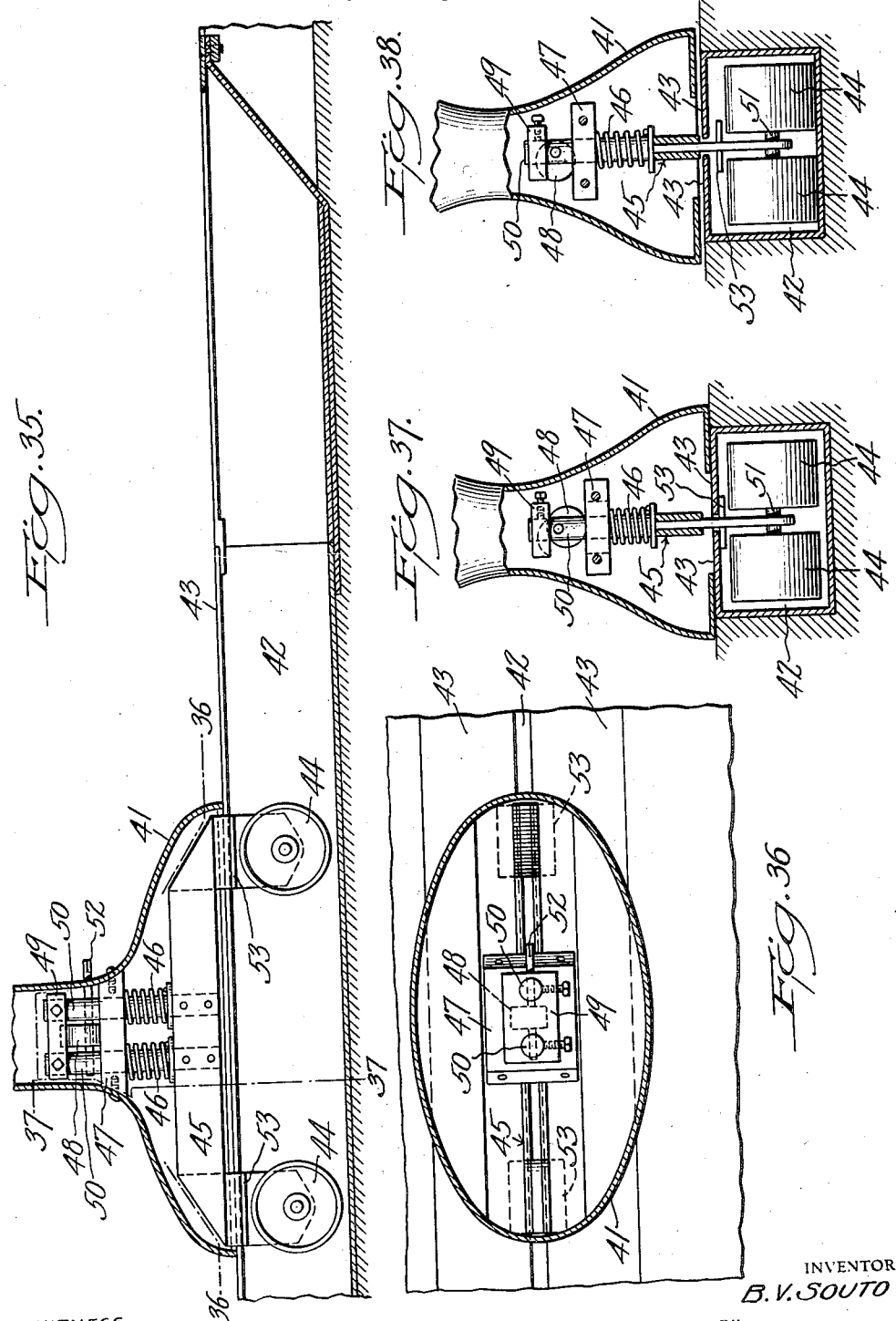

Patented Apr. 30, 1929.

1,711,067

UNITED STATES PATENT OFFICE.

BALDOMERO VIRGILIO SOUTO, OF NEW YORK, N. Y., ASSIGNOR OF ONE-HALF TO WILLIAM P. COMSTOCK, OF NEWARK, NEW JERSEY.

CONVERTIBLE PARLOR CHAIR CAR AND SLEEPER.

Application filed August 12, 1927. Serial No. 212,561.

This invention relates to railway cars adapted to serve the dual purpose of providing sleeping accommodations at night and parlor car accommodations during the day.

An object of the invention is to provide such a combination car with facilities comparable to the comfort and privacy afforded by stateroom cars while retaining the full complement of seating and sleeping capacity furnished by the standard parlor and sleeping cars.

An important feature of the invention is a car divided into sections by permanent bulkheads producing a box girder construction whereby the strength, rigidity and consequent safety of the car is greatly increased. The berths are made up from the seats, arms and backs of the parlor car chairs, the berths being made up in the center of the sections which are made longer than the berths so as to leave dressing rooms at each end of the sections open from floor to ceiling. Demountable partitions at opposite ends, render each dressing room accesible to only one of the berths, thus insuring the maximum of privacy.

A further feature of the invention comprises partitions between the berths and the aisle which are securely fixed in place when the berths are made up, access to the berths from the dressing rooms being at the end and access to the dressing rooms from the aisle being through curtained openings which curtains may be secured on the inside so as to give the privacy of a stateroom.

A further feature of the invention comprises lavatories placed in the bulkheads and arranged side by side but separated by partitions and facing in opposite directions so as to respectively serve the dressing rooms on opposite sides of the bulkheads. These lavatories are concealed in the day make-up by the demountable partitions used to separate each berth from the opposite dressing room at night.

Another feature of the invention is a chair unit comprising demountable upholstered members for the backs, seats and arms, which are made up in rectangular form and of such dimensions as to be capable of reassembly into upper and lower berths. Additional upholstered supplemental members are adapted to form dressing room seats at night or side arms for end settees in the day make-up, accommodating two passangers; the chair unit in this case having the arms laid horizontal flush with the seat and the back turned on its side to give the increased width. To facilitate these changes in seat position, the seats are swiveled on their bases and mounted on tracks or casters movable longitudinally of the car in a slotted channel in the floor.

Other minor features of the invention will be described with reference to the accompanying drawings, in which Figure 1 is a horizontal sectional plan of a car showing the two ends of the car separated and the various possible arrangements of the chairs.

Figure 3 is a horizontal section showing the lower berth made up, taken on line 3—3 of Figure 2.

Figure 4 is a similar view of the upper berth, taken on line 4—4 of Figure 2.

Figure 5 is a transverse section showing in front elevation the bulkhead between the compartments as it appears when the compartment is used as a sleeper, taken on line 5—5 of Figure 2.

Figure 6 is a transverse section through the bulkhead taken on line 6—6 of Figure 5.

Figure 7 is a transverse section through one side of the car showing a chair made up for the day and a front view of the bulkhead as it appears in the daytime, taken on line 7—7 of Figure 1.

Figure 8 is a detail view of the operating mechanism for releasing the swinging partition.

Figure 9 is a plan view showing the middle of the same operating mechanism.

Figure 10 is a vertical section of a retaining latch for the upper bulkhead partition, taken on line 10—10 of Figure 7.

Figure 11 is a horizontal section of the same, taken on line 11—11 of Figure 7.

Figure 12 is a vertical section of a hooked latch for supporting the chair backs on the bulkhead partition, taken on line 12—12 of Figure 33.

Figure 13 is a section showing in detail a clamp for holding the supplemental arms to the seats on line 13—13 of Figure 33.

Figure 14 is a section thru the latch used for securing demountable parts together.

Figure 15 is a side view partially in section of a locking mechanism for securing the seat backs in their position when used for upper berths.

Figure 16 is a transverse section through the upper berth and the window curtain roll box, showing a side view of the locking lever on line 16—16 of Figure 15.

Figure 17 is a transverse section through the side of the car showing the mechanism for supporting a seat in the dressing room on line 17—17 of Figure 2.

Figure 18 is a front view of the same mechanism in its closed position.

Figure 19 is a front elevation and

Figure 20 is a side elevation of a parlor car chair constructed according to my invention.

Figure 21 is an enlarged view of the mechanism for manipulating the side arms of the chair.

Figure 22 is a horizontal section through the latch of said mechanism on line 22—22 of Figure 21.

Figure 23 is a horizontal section through the said mechanism on line 23—23 of Figure 21.

Figure 24 is a section showing the manner of operating the said latch by a key.

Figure 25 is a detail view in end elevation showing the position of the arm manipulating mechanism when the arm is in the upright position.

Figure 26 is a similar view showing the mechanism with the arm in its lower position.

Figure 27 is a detail view showing the hook that supports the back of the chair.

Figure 28 is a view at right angles to that of Figure 27 of the same hook.

Figure 29 is a side view of the latch for holding the back to the side arms.

Figure 30 is a rear view of the same latch.

Figure 31 is a plan of the same latch.

Figure 32 is a rear view of the latch in its folded position.

Figure 33 is a front elevation of a chair made up as a settee.

Figure 34 is a side elevation of the same.

Figure 35 is a longitudinal section through the chair base and the floor channel.

Figure 36 is a horizontal section on line 36—36 of Figure 35.

Figure 37 is a vertical transverse section on line 37—37 of Figure 35.

Figure 38 is a similar view showing the base raised so as to be supported on the truck.

Figure 2:
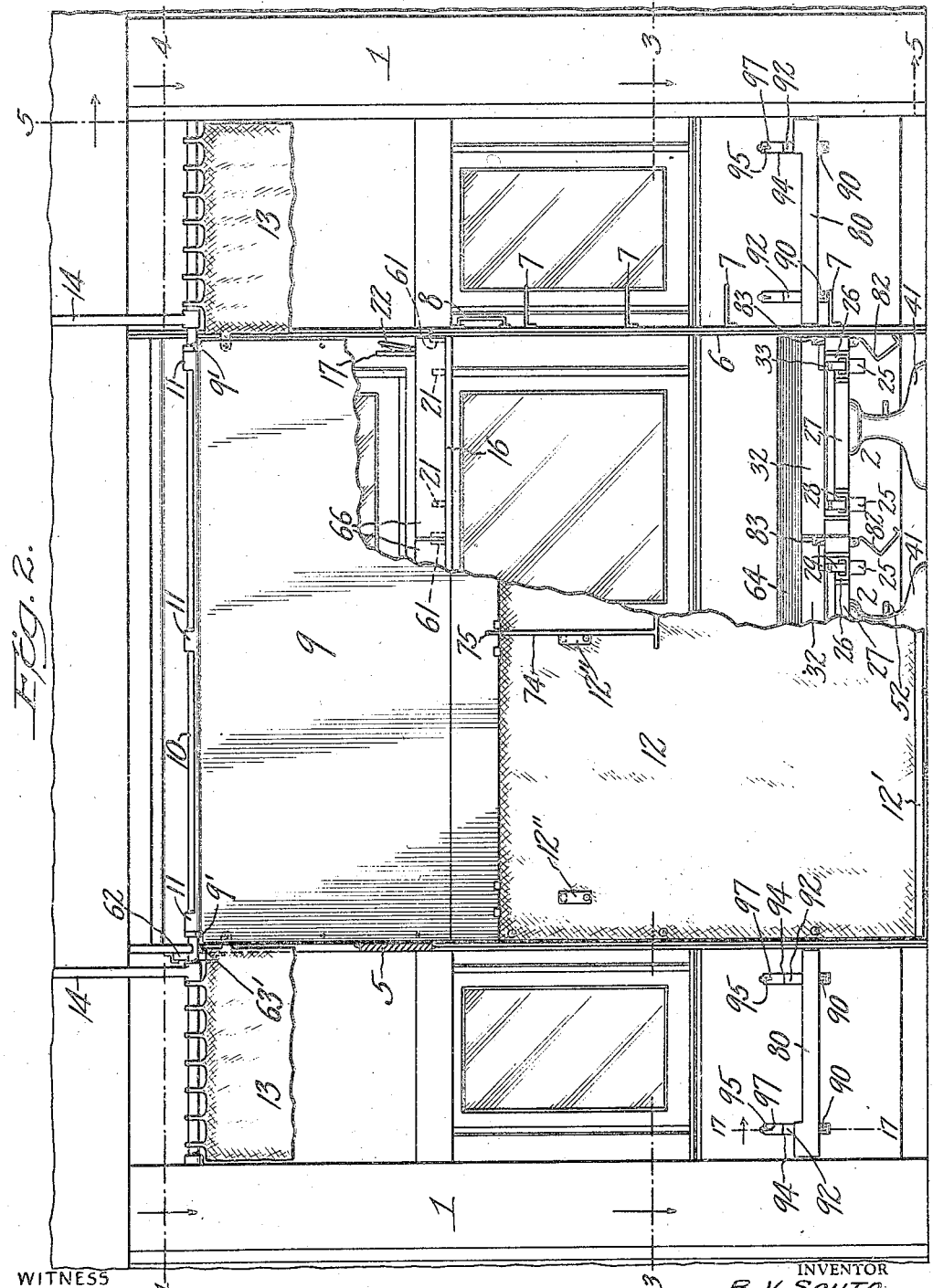
Figure 2 is a side elevation in partial section of one compartment made up as a sleeper.

Referring to Figure 1, a car body of standard length and width is shown with bulkheads 1 dividing the car into ten sections or compartments, five on each side, the space allowed at the ends of the car for wash and toilet rooms and a smoking room providing sleeping space for the porter at night and necessary locker space required for standard equipment. Made up for day use as a chair car, each section contains three chair units 2 which may revolve and may be moved back and forth longitudinally of the car. Made up for night use as a sleeping car, each section contains an upper and a lower berth made up respectively from the backs and seats of the chairs which are made extra wide because of the fact that the usual arms at each side of the seats are not present. The berths are entered from the end and there is dressing space at one end accessible only to the upper berth and another dressing space at the other end accessible only to the lower berth, these dressing spaces are curtained from the aisle and provide individual dressing rooms. With each dressing room is a wash bowl, a small seat and hooks for hanging clothes. The wash bowls are shown at 3 and are enclosed within the bulkheads 1. The wash bowls are placed side by side with a partition 4 between them and while one is accessible from one side of the bulkhead, the other is accessible from the other side so that each dressing space has an individual wash bowl. Demountable partitions at opposite ends of the upper and lower berths close off the space used by the occupant of the other berth so that the occupants are entirely separated at night. Thus one partition 5 extends from the upper berth to the deck of the car and the other partition 6 extends from the upper berth to the floor of the car, (see Figure 2). The latter partition has steps 7 and handle 8 to facilitate access to the upper berth. These partitions are made interchangeable end for end so that the berths can be made up according to the direction of the travel of the car and the wishes of the passenger. Each section is screened from the aisle. That portion in front of the upper berth is a rigid enclosure 9 which is hinged on the aisle side on a curtain rod 10 by hinges 11 and which in day position is swung up to the roof of the car to form the ceiling and in night position forms the aisle side enclosure of the upper berth and also supports the aisle side edge of the upper berth. A stop 9' secured to the curtain rod 10 by impinging on the upper edge of the partition prevents the partition 9 from swinging beyond the vertical into the aisle. Appended from lower edge of this hinged supporting partition is a heavy curtain 12 which extends to the floor and encloses the space of the lower berth, thus separating it from the aisle. A bar 12' at the lower edge of the curtain holds it down. This curtain during the day is rolled up and stored at the outer end of the swinging partition 9, as shown in Figure 7. Tabs 12'' on the outside of the curtain are provided with eyes, so that they can be fastened on hook 15' when the curtain is rolled up so as to hold it in place. Two curtains 13, which at either end enclose the dressing space, are heavy draped curtains, which are hung by detachable hooks from the curtain rod 10. These curtains are fastened along one edge and buttoned in by occupant along the other edge when ready to retire. The curtain rod 10 is supported by suspension rods 14 from the deck or in any other suitable manner. The chairs 2 of which there are three to each section, have upholstered box frames forming seats, arms and backs, each box frame being of rectangular form. The backs are made long enough to be used as upper berths, for which purpose the three backs belonging to a section are assembled side by side with their aisle side resting on a flange 15 which extends shelf-like from the inner side of the partition 9 and on their other ends rest on a shelf 16 (see Figures 7 and 16) that forms part of the box enclosing the curtain roll. Levers 17 (see Figures 15 and 16) are provided at both sides of the berth and are connected to rock shafts 18 that carry locking dogs 19 that engage over lugs 20 located in recessed boxes 21 in the bottom of the berth sections to hold the sections securely in position by a clamping action. The levers 17 have latches 22 engaging with ratchet segments 23 that act to hold the dogs 19 securely in their locked position. The lower berth is made up with the seats and arms of the chair after the backs have been removed. For this purpose, the arms are lowered to horizontal positions so as to make extensions of the seat on each side. The mechanism for doing this is illustrated in Figures 19 to 26. Attached to the arm is one leg 24 of a hinge, the other leg 25 of the hinge being adapted to slide vertically inside of a casing 26 secured to a base part 27 of the seat of the chair. The said casing 26 has lugs 28 which form a pivot for the end of a connecting rod 29, the other end of which is pivoted to another connecting rod 30 that in turn at its further end is pivoted to lugs 31 secured to the outside of the arm 32 of the chair. When the arms are in their upright position, the rod 30 is held close up against the arm by means of a sliding bolt 33 which is projected into this position by springs 34 resting against abutments 35. There are two of these bolts, one at each end of the arm 32 and they are connected by connecting rods 36 to a crank arm 37 turnable on a pivot 38 in the middle of the arm. The pivot 38 has a square shank over which a square socketed key 39 fits (see Figure 24). By means of this key, the porter can unlock the bolts from the rods 30 whereupon the arm 32 can be swung down into the position shown in Figure 26 with its top surface flush with the top surface of the seat and in close juxtaposition thereto. The arm in the lowered position has the connecting rods 29 and 30 folded up to form an effective brace for its support (see Figure 26). When the arms are so lowered to form lateral extensions of the seat, the seats may be, since they are swivel supported on bases 41, turned into parallel position and as the bases 41 are capable of longitudinal movement, the seats may be moved together so that the three of them will form one continuous lower berth (see Figure 3). For this purpose, a channel 42 is formed in the floor with covers 43 approaching within a short distance of each other to form a slot. In the channel are rollers or casters 44 supporting a framework 45 which extends up through the slot between the plates 43 and by means of springs 46 support a cross piece 47 secured to the base of the chair. By this means, the chair base can be rolled back and forth, the rollers 44 travelling on the bottom of the channel. When the chairs have been moved to their desired position, a cam 48 may be turned so as to compress the springs 46, cam 48 acting to push up a cross head 49 that is connected to rods 50 that, passing thru the cross piece 47 and thru the springs 46, are secured to the frame 45 and so lift the shaft 51 on which the rollers 44 turn. The end of the shaft of the cam 48 may have a square extension 52 (see Figure 35) adapted to fit the same key that is used for unlocking the bolts that hold the side arms. When the rollers 44 are thus lifted free of the floor of the channel 42, the chair base 41 is allowed to come to rest on the floor and is clamped thereon by the cross plate 53 attached to the frame 45, impinging on the under side of the slot plates 43. When the three chairs of a section are moved into juxtaposition, they form a lower berth, as shown in Figure 3.

Referring to Figure 3, lower partitions 6, which during the daytime are used to close the two lavatory spaces of the section, are placed together to form an end partition for the lower berth, shutting the same off entirely from the dressing room appertaining to the upper berth. At the same time, an upper partition 5, that during the daytime closes the space above the lavatories so as to form a cupboard for the storage of bedding, etc., is placed at the other end of the upper berth and forms a partition between the upper berth and the dressing room used by the occupant of the lower berth, entirely shutting off the upper berth from such dressing room. These partitions may have matched edges adapted to fit into grooves in the side of the car and are also provided with locking devices for securing them in position. Such a locking device is illustrated in Figure 14, where two latches 56 are secured to each end of a turning pin 57 which moves with a certain amount of end play in a socket 58 having recesses 59 for the latches 56. The end play allows either latch to be introduced through a slot 60 in a jamb plate 61 and then turn so as to secure the member or partition in which the latches 56 are located to a suitable fixed position. Similar jamb plates are shown at 61' for securing the closet covers in their day positions (see Figures 5 and 6). The upper partition 5 has in addition a tongue 62 (see Figures 10 and 11) at its upper edge next the aisle to engage with the curtain rod so as to lock the partition to the rod. The tongue 62 is pushed outward by springs 63 and has a slot 63' at its outer end adapted to engage over the curtain rod. The slot 63' is curved downwardly so that the partition will hang on the rod 10 even if lowered at its rear edge. Where the partitions fit against the wall or deck of the car they may be provided with projecting beads adapted to match within appropriate grooves.

In Figure 7 there is shown a pocket 64 in the side wall of the car which is required to gain space to permit the rotation of the chair arms when in their lowered position. The swinging partition 9 which in the day make-up forms a ceiling for the section and in the night make-up forms the aisle side partition for the upper berth, is provided with a supplemental upholstered portion 65 (see Figure 4), the top surface of which is flush with the top surface of the berth members 66 and therefore adds to the width of the berth. This part 65 rests upon or against the flange 15 of the partition 9. At the outer edge of the swinging partition is a latch 67 adapted to engage over a flange 68 on the side of the car (see Figures 8 and 9). There may be several of these latches attached to a bar 70 that are pushed outward by means of springs 71 to automatically engage the latches 67 over the plate 68. To retract the latches, a retractor key 72 mounted on a spindle 73 may be used. The spindle 73 has attached to it a depending operating handle 74, hinged to 73 at 75, as shown in Figure 8. The object of the handle 74 is to render the latch operating mechanism accessible by the porter, and the object of pivoting the same is to have it hang in a vertical position without regard to the position of the partition 9. The handle 74 is also useful in enabling the porter to lower and raise the partition.

The various positions that the chairs may occupy are shown in Figure 1. In one arrangement two of the chairs are moved to the ends of the section and have their arms lowered and their backs turned over sidewise so as to form settees. In such case the backs are secured to the end partitions by a device such as shown in Figure 12. The backs 66 are provided with recesses covered by slotted plates 75' adapted to engage over hooks 76 which are pivoted in a receptacle 77 and provided with a heel 78 engaging against a stop 79. The hooks when not in use can be folded up into the receptacle 77. When made up as end settees in this manner, the seats are provided with supplemental arms 80 (see Figures 33 and 34). These supplemental arms are provided with hinged hooks 81 (see Figures 33, 34 and 13) which, when the supplemental arms are not in use, can be folded into proper receptacles in the edges of the arms. The hooks are adapted to engage under the lowered arms of the chair and lock the supplemental arms to the lowered arms at the front end of the settee, as shown in Figure 13, while at the rear end they are held to the partition wall by a hook, as shown in Figure 12. During the night make-up, two of these supplemental arms may be used as dressing room seats (see Figures 3, 4, 17 and 18). In this case they rest upon brackets 90, hinged at 91 to the side of the car and having a right angle supporting arm 92 with flanges 93 that will in the lowered position of the bracket rest against the inside of car wall 94. In the day make-up these brackets can be folded up so as to occupy a slot in the side of the car wall and be flush with the said wall. They will be held in this position by means of a latch 95 engaging over a lip 96 on the end of the bracket 90, springs 97 and 97' being employed to make the latch respectively engage when the bracket is moved up into place and release the bracket when the latch is lifted. The other two supplemental arms may be stored in one of the closet spaces either above or below the wash basins. At 82, (see Figures 25, 27 and 28), is shown a hook hinged to the bottom of the chair and adapted to form a lower receptacle for the back 66 of the chair. When made up as a chair, the back is held to the arms as shown in Figures 29, 30 and 31 by a dog 83 which is attached to a rod 84 pivoting and sliding in a receptacle 85 inside the chair arms. By folding the dog down, as shown in Figure 32, the back of the chair becomes released and may be taken off by the porter from the hook 82 and used to make up the upper berth.

From the above description it will be seen that I have produced a combination parlor and sleeping car that has as a sleeper all the privacy and convenience of a stateroom car, and as a parlor car an unusual flexibility of chair arrangements combined with a complete elimination of all appearances of a sleeping car. The aisle at night will be free of obstructions such as step-ladders, satchels or shoes, and occupants of the berths cannot be disturbed by persons being thrown partway into the berths by the lurching of the car. The dressing spaces occupy no more than just sufficient room for dressing purposes. They enable the dresser to stand upright, and they provide wall space for hanging up clothes, so that they may not become creased.

While I have described various devices for carrying out the purposes of my invention, I do not wish to be limited specifically to them, as many other mechanical appliances that will accomplish the same purpose will occur to those skilled in such matters.

I claim:—

1. A parlor and sleeping car divided into sections by double walled bulkheads extending from the car wall to the aisle, two lavatories in each bulkhead accessible respectively from adjacent sections, longitudinal upper and lower berths located centrally in the sections, with spaces between each end of the berths and the bulkheads, and demountable partitions at each end of the berths, one extending from the floor to the upper berth and the other from the upper berth to the ceiling of the car, said partitions being adapted to close in the open spaces of the bulkheads for day use.

2. In a parlor and sleeping car, a partition hinge-supported from the top of the car on the aisle side and adapted when swung up to form a finished ceiling and when lowered to form a support for the aisle side of the upper berth, and a partition between the berth and the aisle.

3. In a parlor and sleeping car, a partition hinge-supported from the top of the car on the aisle side and adapted when swung up to form a finished ceiling and when lowered to form a support for the aisle side of the upper berth, and having secured thereto at its swinging side a curtain adapted to reach to the floor when the partition is lowered to form a screen for the lower berth.

4. In a parlor and sleeping car, having chairs with removable backs, a partition hinge-supported from the top of the car on the aisle side and adapted when swung up to form a finished ceiling and when lowered to form a support for the aisle side of the upper berth, with an upper berth formed by the backs of the chairs laid horizontally and demountably secured at one end to the side of the car and at the other end to the lower part of the hinged partition.

5. In a parlor and sleeping car, a partition hinge-supported from the top of the car on the aisle side and adapted when swung up to form a finished ceiling and when lowered to form a support for the aisle side of the upper berth, a curtain secured to the swinging side of the partition, a dressing room at each end of the section, the partition forming a screen between the upper berth and the aisle and the curtain a screen between the lower berth and the aisle, and curtains between each of the dressing rooms and the aisle.

6. In a parlor and sleeping car, a partition hinge-supported from the top of the car on the aisle side and adapted when swung up to form a finished ceiling and when lowered to form a support for the aisle side of the upper berth, with a cushion at the lower edge of the hinged partition to add to the width of the upper berth.

7. A parlor and sleeping car divided into sections, a partition hinged at the top on the aisle side and adapted when swung up to form a finished ceiling and when lowered to form a support for the aisle side of the upper berth, arm chairs in each section, the seats and arms of which are adapted to be made up into a lower berth by placing the chairs together and lowering the arms to be flush with the seats and the backs of the chairs are adapted to be made up into an upper berth by being placed side by side with suitable supports at the side of the car and the lower edge of the hinged partition upon which the ends of the chair backs rest.

8. A combined parlor and sleeping car having a swinging partition, hinge supports for said partition at the side of the aisle, supports on the side of the car for the free side of the partition, a latch engaging the said free side with said side support, and a key for operating the latch having a pendant handle hinged thereto.

9. A combined parlor and sleeping car having transverse double walled bulkheads extending from the side of the car to the aisle, said bulkheads having a shelf dividing an upper closet space from the lower part, said lower part having a vertical partition dividing said space into two compartments, the latter compartments each having a lavatory and being respectively partitioned off permanently from opposite sides of the bulkhead, and demountable partitions for closing in the lavatories, said partitions being also adapted to form an end partition for the lower berth and a separate demountable partition for closing in the closet space above the shelf, said latter partition being adapted to form an end partition for the upper berth.

10. A combined parlor and sleeping car having a swinging partition hinged to the roof on the aisle side and adapted to be lowered to form a partition between the upper berth and the aisle and a support for the upper berth and end partitions, transverse double walled bulkheads extending from the side of the car to the aisle, said bulkheads having a shelf dividing an upper closet space from the lower part, said lower part having a vertical partition dividing said space into two compartments, the latter compartments each having a lavatory and being respectively partitioned off permanently from opposite sides of the bulkhead, and demountable partitions for closing in the lavatories, said partitions being also adapted to form an end partition for the lower berth and a separate demountable partition for closing in the closet space above the shelf, said latter partition being adapted to form an end partition for the upper berth.

11. In a parlor and sleeping car, having chairs with removable backs, a member supported from the top of the car on the aisle side and adapted when lowered to form a support for the aisle side of the upper berth, with an upper berth formed by the backs of the chairs laid horizontally and demountably secured at one end to the side of the car and at the other end to the lower part of the said member.

12. In a parlor and sleeping car, a member supported from the top of the car on the aisle side and adapted when lowered to form a support for the aisle side of the upper berth, with a cushion at the lower edge of the said member to add to the width of the upper berth.

13. A parlor and sleeping car divided into sections, berth supports supported from the top of the car on the aisle side of each section and adapted to be raised and lowered, arm chairs in each section, the seats and arms of which are adapted to be made up into a lower berth by placing the chairs together and lowering the arms to be flush with the seats and the backs of the chairs adapted to be used as upper berth members by being placed side by side, with suitable supports at the side of the car and the lower edge of the said berth supports upon which the ends of the chair backs rest.

14. A parlor and sleeping car divided into sections, berth supports supported from the top of the car on the aisle side of each section and adapted to be raised and lowered, arm chairs in each section, the seats and arms of which are adapted to be made up into a lower berth by placing the chairs together and lowering the arms to be flush with the seats and the backs of the chairs adapted to be used as upper berth members by being placed side by side with suitable supports at the side of the car and the lower edge of the said berth supports upon which the ends of the chair backs rest, and means for locking the ends of the berth members to their supports.

15. A combined parlor and sleeping car having transverse double walled bulkheads extending from the side of the car to the aisle, said bulkheads having a shelf dividing an upper closet space from the lower part, said lower part having a vertical partition dividing said space into two compartments, the latter compartments each having a lavatory and being respectively partitioned off from opposite sides of the bulkhead, and demountable partitions for closing in the lavatories, said partitions being also adapted to form an end partition for the lower berth and a separate demountable partition for closing in the closet space above the shelf, said latter partition being adapted to form an end partition for the upper berth.

16. A combined parlor and sleeping car having transverse double walled bulkheads extending from the side of the car to the aisle, said bulkheads having a shelf dividing an upper closet space from the lower part, said lower part having a vertical partition dividing said space into two compartments, the latter compartments each having a lavatory and being respectively partitioned off from opposite sides of the bulkhead, and demountable partitions for closing in the lavatories, upper and lower berths spaced apart from the bulkheads, said partitions being also adapted to form an end partition for the lower berth and a separate demountable partition for closing in the closet space above the shelf, said latter partition being adapted to form an end partition for the upper berth to form closed-in dressing rooms of the spaces between the berths and bulkheads.

17. A combined parlor and sleeping car having a berth support depending from the roof on the aisle side and adapted to be lowered to form a support for the aisle side of the upper berth and a curtain housing on the wall of the car, and means on the said housing to support the wall side of the upper berth.

BALDOMERO V. SOUTO.